United States Patent [19]

Hseu

[11] Patent Number: 4,872,854
[45] Date of Patent: Oct. 10, 1989

[54] SIMULATED BALL USED IN SPORTS INCORPORATING AN ELECTRONIC COMPONENT

[75] Inventor: Victor C. Hseu, St. Louis, Mo.

[73] Assignee: Hyman Products, Inc., Maryland Heights, Mo.

[21] Appl. No.: 172,016

[22] Filed: Mar. 23, 1988

[51] Int. Cl.⁴ .............................................. H01R 3/00
[52] U.S. Cl. .................................. 439/577; 273/586; D14/176
[58] Field of Search .............. 439/577; 273/58 B, 58 G; D14/68, 69

[56] References Cited

U.S. PATENT DOCUMENTS

| | | | |
|---|---|---|---|
| D. 133,539 | 8/1942 | Dow | D14/69 |
| D. 196,679 | 10/1963 | Schaffer | D14/69 |
| 2,849,819 | 9/1958 | Murphy et al. | 273/58 G |
| 2,942,379 | 6/1960 | Oman et al. | 273/58 G |
| 4,071,242 | 1/1978 | Supran | 273/58 G |
| 4,775,948 | 10/1988 | Dial et al. | 273/58 G |

Primary Examiner—Joseph H. McGlynn
Attorney, Agent, or Firm—Polster, Polster and Lucchesi

[57] ABSTRACT

A simulated ball used in sports is disclosed as having an electronic component mounted therein with exposed controls for operation by a user. The ball includes a hollow body over which a complementary shaped ball cover is mounted, the body receiving the electronic component in a recess provided in an outer wall of the hollow body, said body further including means associated therewith to position and hold the electronic component within the hollow body. The complementary shaped ball cover has a corresponding opening there through to allow exposure of the controls of the electronic component, and the ball cover is drawn in generally close fitting and conforming relationship to the outer wall of the hollow body. A body is preferably formed from two generally curvilinearly shaped thin-walled plastic half sections which terminate in complementary interfitting free end portions with a thin-walled disc shaped element extending substantially across the hollow body and structurally inter-engaging the complementary interfitting free end portions to provide radially outwardly directed and circumferentially extending support therefore. The electronic component is mounted to a supporting frame position within the confined of the hollow body, with the body having alignment means associated therewith to facilitate assembly and positioning of the supporting frame in a position spacing the supporting frame and the electronic component mounted thereto from the hollow body.

36 Claims, 5 Drawing Sheets

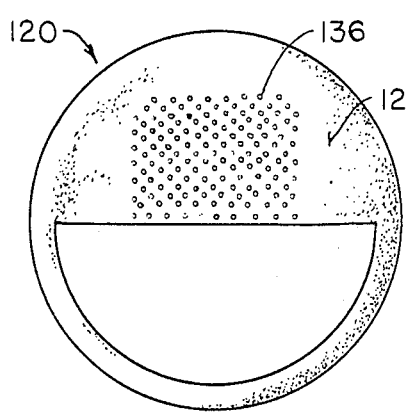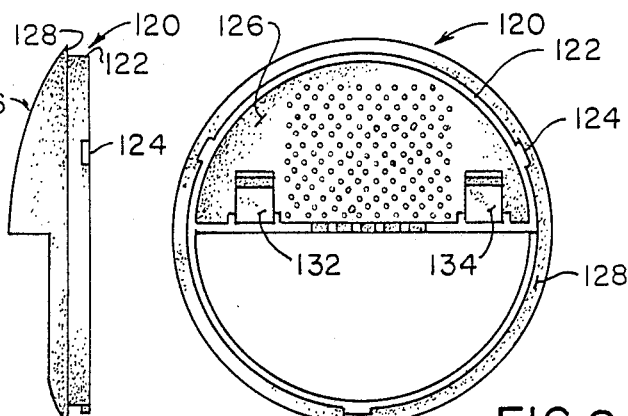
FIG.6. FIG.7. FIG.8.
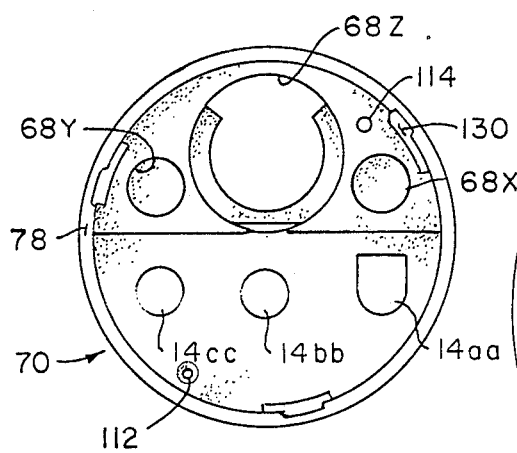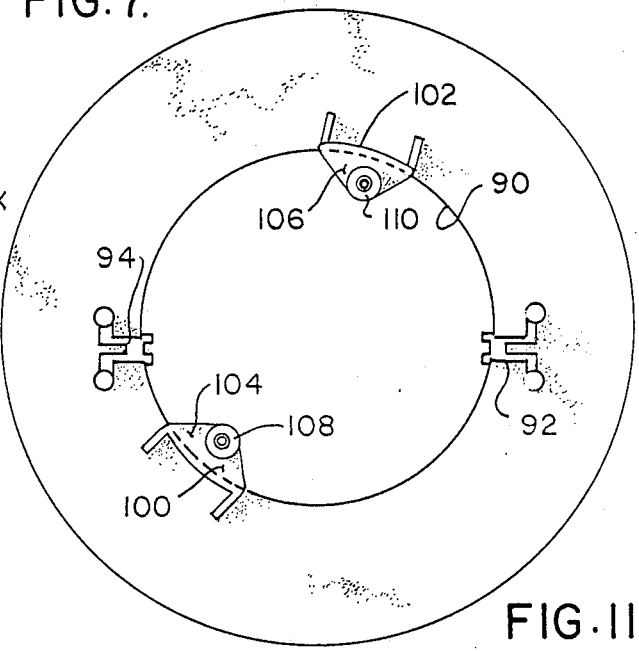
FIG.9. FIG.11.
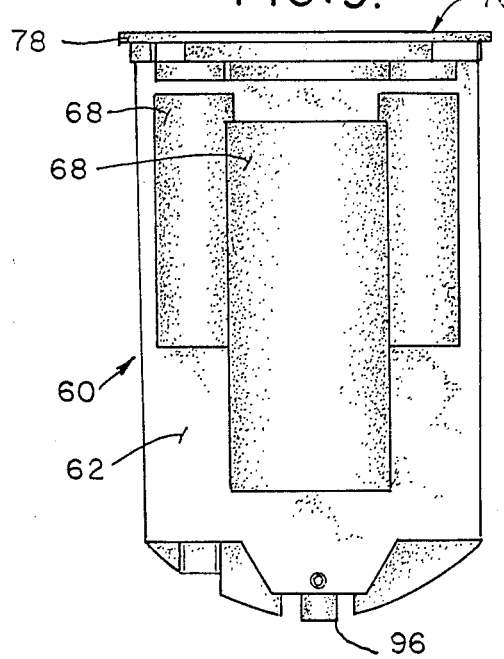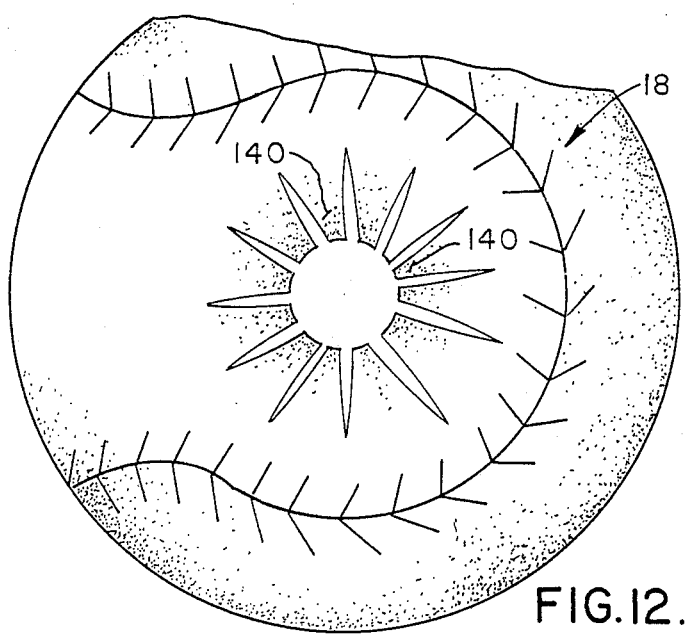
FIG.10. FIG.12.

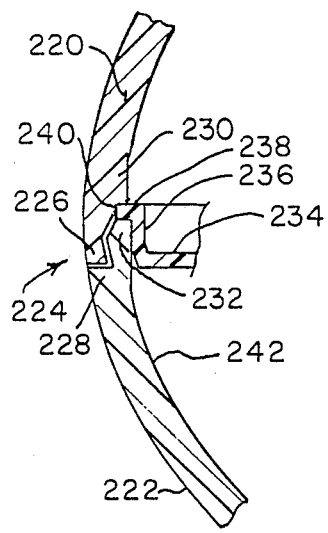
FIG. 15.
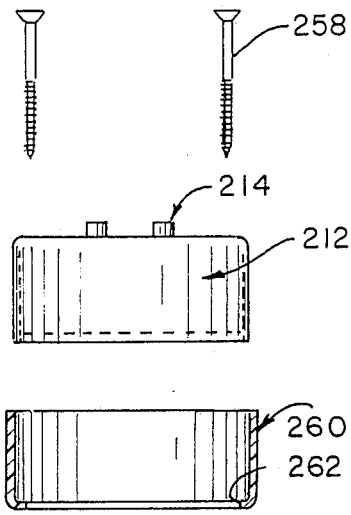
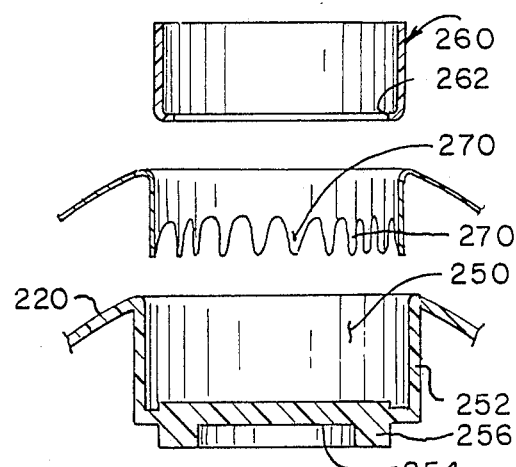
FIG. 17.
FIG. 18.
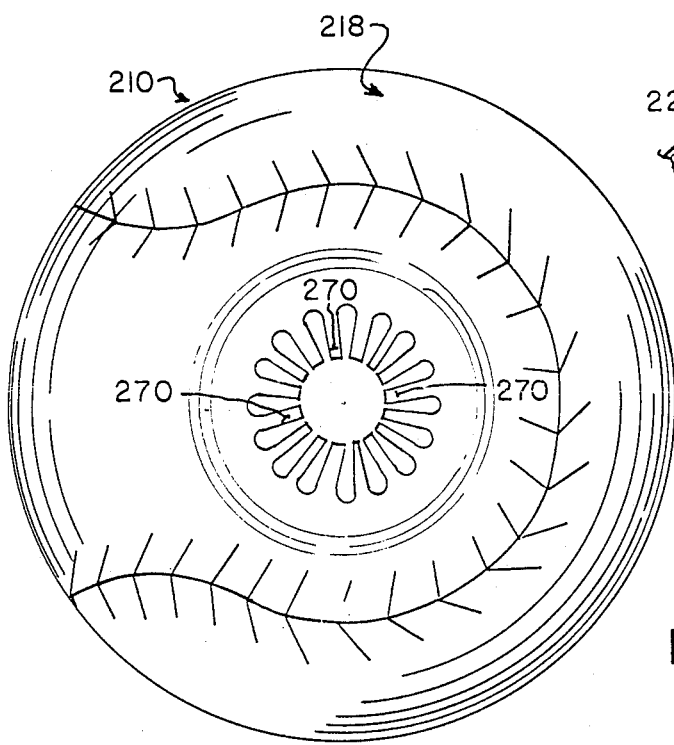
FIG. 16.

SIMULATED BALL USED IN SPORTS INCORPORATING AN ELECTRONIC COMPONENT

BACKGROUND OF THE INVENTION

This invention relates to a simulated ball used in sports, and more particularly, to a simulated ball used in sports in which an electronic component, such as a radio or clock, is incorporated therein.

Sports of all kinds are enjoyed by people throughout the world. National and international sporting events are attended by thousands of people who appreciate the skill and excitement of the athletic contest. Radio and television have expanded the audience with the sports announcers creating an evermore exciting environment in which the sporting event takes place.

Anyone who had gone to a large crowd sporting event will see some people who have brought portable radio and tv sets to "tune in" to the sports announcer while watching the live sporting event. Although radios and tvs are bulky and heavy to carry, that has not dissuaded the sports fan who enjoys hearing the sports announcer while seeing the live sporting event. An existing market is already in place for people who want to listen to the play-by-play action described by a sports announcer, without giving up the excitement of seeing the live sports action together with the live crowd participation.

Sports fans also enjoy catching a ball hit or thrown into the stands. Baseball fans, in particular, seem to go out of their way to try to catch a "foul ball". The same is true of other sports. Fans seem to feel that there is something special about catching and hopefully keeping a ball from the athletic playing field. Perhaps it is being involved in part of the action from the field itself or obtaining a souvenir from a well known sports hero. In any case, there is considerable excitement in catching and keeping a ball hit or thrown from the athletic field into the stands.

The present invention seeks to combine the excitement associated with play-by-play broadcasting with a simulated ball product used in sports, as will become apparent.

SUMMARY OF THE INVENTION

Among the various objects and features of the present invention is the provision of a simulated ball used for sports which incorporates an electronic component therein.

Another object of the present invention is the provision of a simulated ball used for sports which very closely resembles the official ball in a particular sport, while also having battery operated electronic component incorporated therein.

A further object of the present invention is the provision of a simulated ball used in sports having an electronic component incorporated therein, where the ball cover has a corresponding opening for receiving the electronic component and yet is drawn in close fitting and conforming relationship to the outer surface of this simulated ball to give a realistic appearance.

An additional object of the present invention is the provision of the simulated ball with an electronic component positioned in the hollow body thereof, and which the construction and arrangement facilitates assembly and positionment of the electronic component within the hollow body of the simulated ball.

Still another object of the present invention is the provision of a simulated ball for use in sports having an incorporated electronic component in hollow body of the ball in which the simulated ball has great structural integrity and strength.

Other objects of the present invention include the provision of a relatively small, light weight, relatively inexpensive and realistic-looking simulated ball for use in sports having an electronic component such as a radio, clock or the like mounted therein, that will provide many hours of user enjoyment.

Briefly stated, the simulated ball used in sports has an electronic component mounted therein with exposed controls for operation by a user. The ball includes a hollow body over which a complementary shaped ball cover is mounted with the hollow body receiving the electronic component in a recess provided in an outer wall of the hollow body, and the hollow body also including means of associated therewith to position and hold the electronic component within the hollow body. The complementary shaped ball cover has a corresponding opening there through to allow exposure of the controls of the electronic component with the ball cover being drawn and generally close fitting and conforming relationship to the outer wall of the hollow body.

Preferably, the hollow body is formed from two generally curvilinearly shaped thin-walled plastic half sections which terminate in complementary interfitting in portions, with a thin-walled disc-shaped element extending substantially across the hollow body and structurally inter-engaging the complementary interfitting free end portions of the thin-walled plastic half sections to provide laterally outwardly directed and circumferentially extending support therefor. The complementary interfitting end portions of the thin-walled plastic half sections include inner and outer shoulder portions which have a complementary interfitting relationship between themselves and the thin-walled disc-shaped element which is structurally inter-engaged therewith.

It is also preferred that the electronic component is fixedly mounted to supporting frame which is received through an opening formed in the disc-shaped element which also has alignment means associated therewith to facilitate assembly and positioning of the supporting frame in a position spacing the supporting frame and the electronic component mounted thereto from the hollow body. A transversely extending panel means extends from the supporting frame at one end thereof and is positioned in general alignment with the outer wall of the hollow body. The transversely extending panel means includes openings for receiving batteries and for mounting an electronic component cover that covers these batteries while allowing exposure of the controls for the electronic component.

The ball cover is mounted over the hollow body and is provided with a plurality of circumferentially extending and closely spaced flexible fingers which are received within the recess of the body to enable an endless collar to engage and trap the flexible fingers in the recess while drawing material portions of the ball cover surrounding the flexible fingers in generally tight fitting and conforming relationship to the generally curvilinearly shaped body over which the ball cover is mounted. The electronic component is thereafter positioned within the recess and fastened to the hollow body of the simulated ball.

BRIEF DESCRIPTION OF THE DRAWINGS

FIG. 6 is a top plan view illustrating an electronic component cover used in connection with the baseball radio embodiment of FIGS. 1-12;

FIG. 7 is a side elevational view of the electronic component cover shown in FIG. 6;

FIG. 8 is a bottom plan view of the electronic component cover shown in FIG. 6-7;

FIG. 9 is a top plan view depicting a transversely extending panel means which may be used with the baseball radio embodiment of FIGS. 1-12 and the electronic component cover illustrated in FIGS. 6-8;

FIG. 10 is a side elevational view illustrating a supporting frame and transversely extending panel means which may be used with the baseball radio embodiment of FIGS. 1-12;

FIG. 11 is a top plan view illustrating alignment and fastening means which may be used with the supporting frame and transversely extending panel means in the baseball radio embodiment of FIGS. 1-12;

FIG. 12 is a fragmentary top plan view illustrating the baseball cover showing circumferentially extending and closely spaced flexible fingers thereof;

FIG. 15 is an enlarged fragmentary sectional view showing the structural inter-engagement between hollow body parts forming the simulated baseball embodiment of FIGS. 13-18;

FIG. 16 is a top plan view showing the baseball cover used in connection with the FIGS. 13-18 the embodiment including circumferentially extending and closely spaced finger elements which are used to mount the baseball cover in close and tight fitting relationship to the hollow body of the simulated baseball;

FIG. 17 is an exploded sectional view illustrating the manner in which the electronic clock and the baseball cover are mounted to a recess formed in the hollow body of the simulated baseball; and FIG. 18 is a fragmentary sectional view showing the assembled relationship between the electronic clock, baseball cover and the recess of the hollow body forming the simulated baseball, of the FIGS. 13-18 embodiment.

DESCRIPTION OF THE PREFERRED EMBODIMENT

Figure 1:
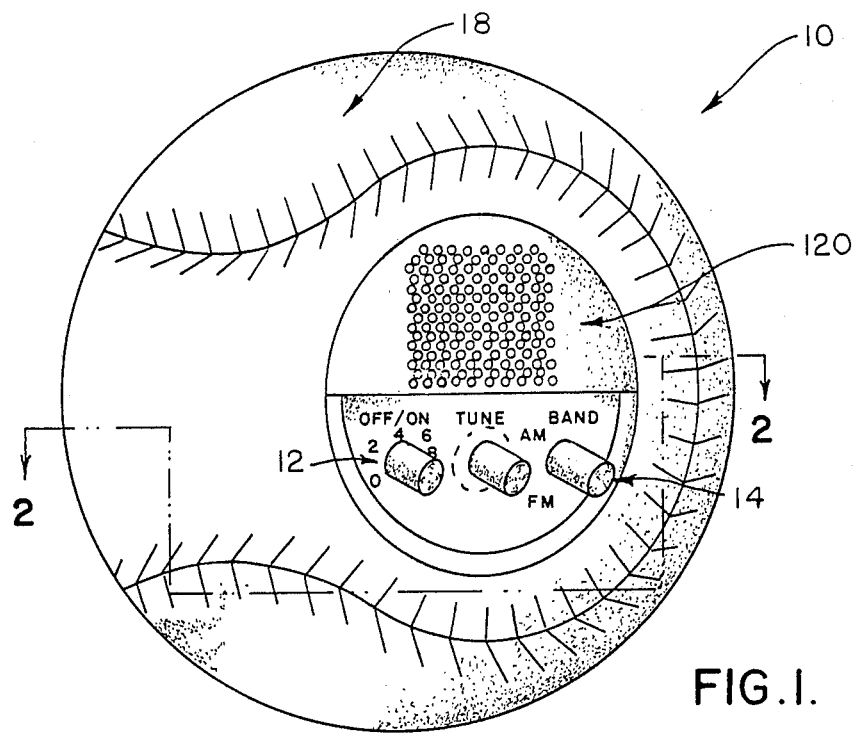
FIG. 1 is a top perspective view of a simulated ball used in sports incorporating an electronic component, specifically known and described in connection with the FIGS. 1-12 embodiments to be a baseball radio.

In the description that is to follow, it is to be understood that while baseballs are principally shown and described herein, the term "simulated ball used in sports" may include generally spherical sports balls such as baseballs, basketballs, soccers, as well as oblong sports balls such as footballs and the like. Similarly, the term "electronic component" may include a radio or clock such as illustrated in the drawings in which the "electronic component" includes many individual electronic parts and devices which make up the "electronic component". In view of the continuing miniaturization of "electronic components", it is further conceivable that electronic products other than radios or clocks may be used as an "electronic component" in the present invention.

Figure 2:
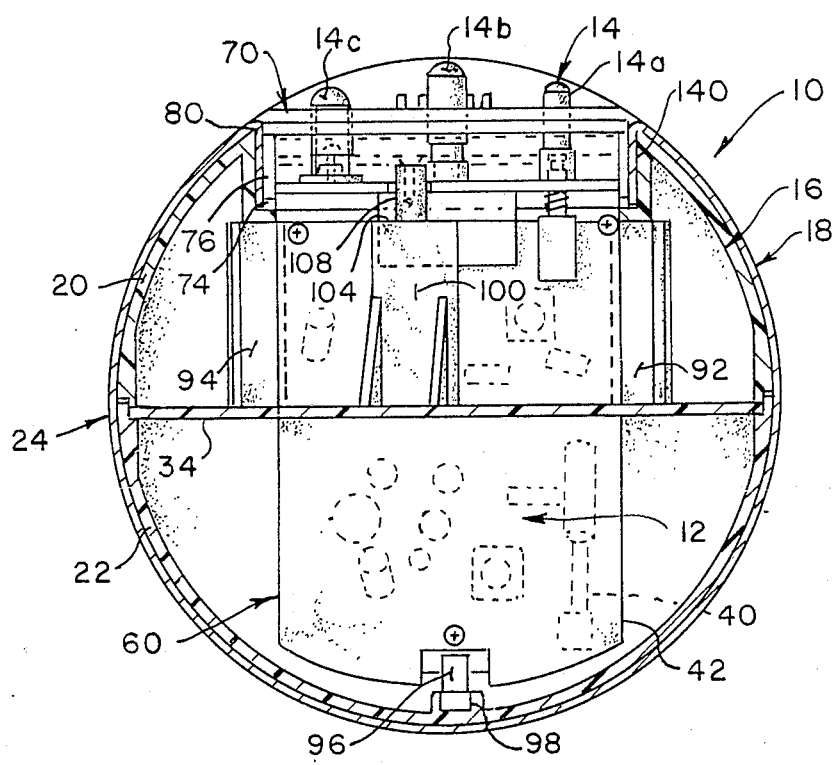
FIG. 2 is a sectional view seen along lines 2—2 of FIG. 1.

Referring now to the FIGS. 1-12 embodiment, and first to FIGS. 1-2, it will be seen that a simulated ball 10 used in sports known as a baseball in the drawings has an electronic component 12 mounted therein with exposed controls 14 for operation by a user. The electronic component 12 shown in FIGS. 1-12 comprises a radio with the exposed controls 14 being used to change the volume, tuning and AM/FM selection. The baseball 10 shown in the drawings includes a generally spherically shaped hollow body 16 over which a complementary shaped flexible seamed ball covering 18 is mounted. The flexible ball covering 18 has a corresponding opening, as will be described, allowing exposure of the controls 14 of the electronic component 12. As also shown, the ball covering 18 is drawn in generally close fitting and conforming relationship to the hollow body 16, and the manner in which this accomplished along with the mounting of the electronic component 12 will be described in further detail.

Figure 3:
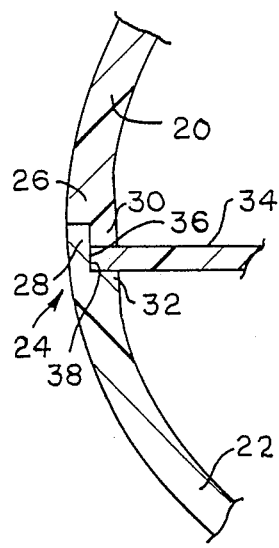
FIG. 3 is an enlarged fragmentary sectional view illustrating the structural inter-engagement of various hollow body parts.

The hollow body 16 of the baseball 10 is preferably formed from two generally semi-spherically shaped thin-walled plastic half sections 20, 22, which terminate in complementary interfitting free end portions which are generally identified at 24. The thin-walled plastic half sections 20, 22 are injection molded or thermoformed to the shape shown. It is well known that where thin-walled plastic constructions of the type shown in the drawings are used, there is an inherent weakness in the hoop strength at the free ends of the half sections 20, 22, thus tending to allow the free end portions to deform or collapse. To overcome this problem according to the present invention, the interfitting free end portion construction 24 is provided. As seen in FIG. 3, the complementary interfitting end portion 24 includes complementary interfitting outer shoulder portions 24, 26 and inner shoulder portions 30, 32 provided on the half sections 20, 22 respectively. The outer shoulder portions 24, 26 are laterally and circumferentially offset from the inner shoulder portions 30, 32 as shown. The outer laterally and circumferentially offset shoulder portions 26, 28 preferably directly engage one another as shown in FIG. 3 of the drawings. The inner laterally and circumferentially offset shoulders 30, 32 are circumferentially spaced from one another to allow a thin-wall plastic disc-shaped element 34 to be positioned there between. The thin-walled plastic disc-shaped element is preferably sized and positioned to be received both in lateral and circumferential engagement with the complementary interfitting end portions 24 of the thin-walled plastic half sections 20, 22. More specifically, it will be seen that the disc-shaped element 34 includes a circumferential end surface 36 which engages inner surface wall 38 the half section 20. In addition, the inner laterally and circumferentially offset shoulders 30, 32 directly oppose and engage the disc-shaped element 34 in opposing circumferential engagement. It will also be noted that the outer shoulder 28 and the inner shoulder 30 of the plastic half sections 20, 22 respectively, have overlapping engagement to provide additional lateral support. This structural configuration and inter-engagement provides laterally outwardly directed and circumferentially extending support for the thin-walled plastic half sections 20, 22 in the complementary interfitting free end portions 24 thereof. When thus assembled as shown in the drawings, the hoop strength of the entire spherically shaped hollow body 16 is greatly increased, thereby affording greater structural integrity resisting deformation or collapse throughout the entire spherically shaped hollow body 16.

In order to hold the thin-walled plastic half sections 20, 22 together to form the general spherically shaped hollow body 16, releasable fastening means such as a releasable interlocking means integrally associated with the complementary interfitting free end portion 24 may be provided as described later in connection with the FIGS. 13-18 embodiment, or adhesive tape [not shown] may be used. Because the flexible baseball covering 18 is in tight fitting and close conforming relationship to an outer wall of the spherically shaped hollow body 16, this also keeps the thin-walled plastic half section 20, 22 in assembled relationship to one another.

Reference is now made to FIGS. 2, 4-5 and 9-11 for the manner in which the electronic component 12 is mounted within the hollow body 16. Electronic component 12 shown in the FIGS. 1-12 embodiment comprises a radio which is generally shown by dotted line representations in FIGS. 2 and 4-5 to include electronic component parts 40 mounted on a printed circuit board 42. Electronic component parts 40 are shown in dotted line representations in the drawings because they, by themselves are not part of the present invention. Suffice it to say that the electronic component parts 40 are well known in the art, and comprise the electronic component radio 12 shown in FIGS. 1-12 of the drawings. At the upper end of the printed circuit board 42, a snap action switch 44 is operated by reciprocating electronic control knob 14a to change the band from FM to AM and vice versa. Electronic control knob 14b is rotary connected to the tuning frequency band selector 46 to select the particular radio frequency desired. Rotary electronic control knob 14c is threadably connected to a rotary volume control 48, also mounted at the upper end of the printed circuit board 42 to increase or lower the volume desired. Radio 12 is also equipped with a highly sensitive built in ferrite rod antenna 50 partially shown in FIG. 4 of the drawings.

Figures 4, 5:
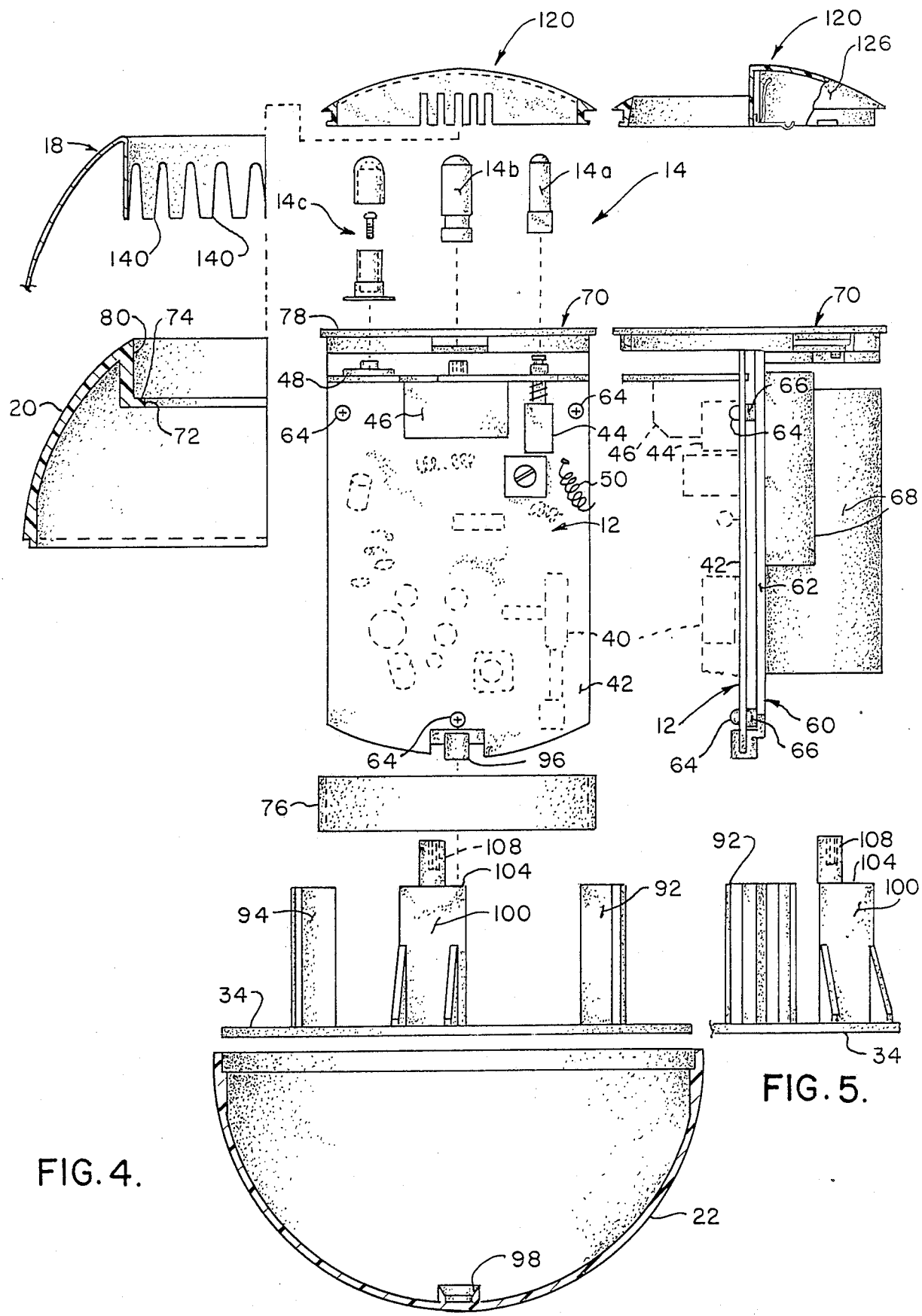
FIG. 4 is an exploded side elevational view, partially in section, showing the constituent and principal parts of the baseball radio embodiment illustrated in FIGS. 1-12 of the drawings.
FIG. 5 is an exploded end elevational view, also partly in section, showing some of the constituent and principal parts of the baseball radio embodiment of FIGS. 1-12.
Figure 13:
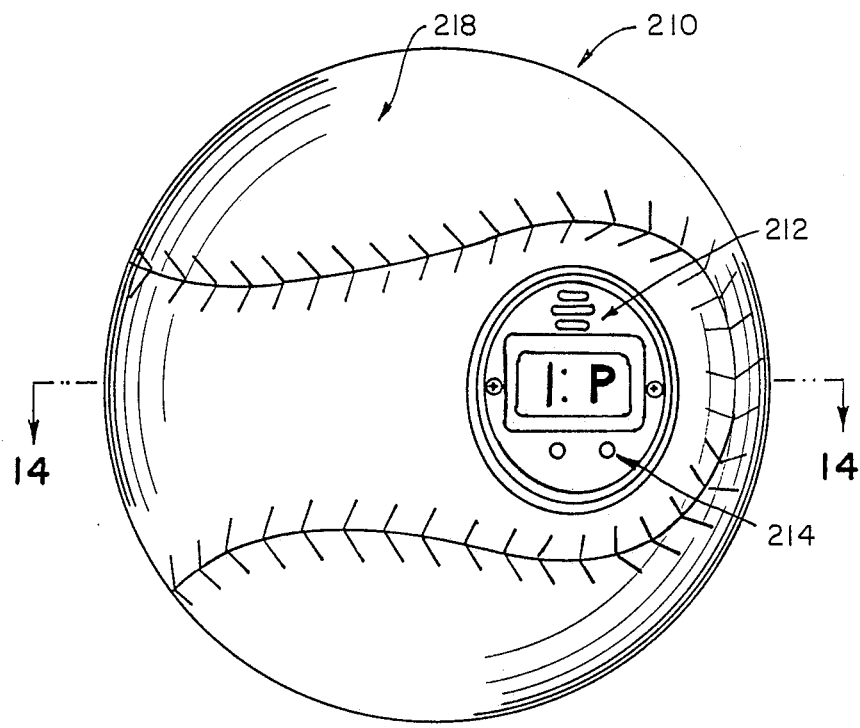
FIG. 13 is a top perspective view also showing a simulated baseball construction with an electronic clock in lieu of the radio embodiment illustrated in the FIGS. 1-12.

The radio 12 is fixedly mounted to a supporting frame 60 as best seen in FIGS. 4-5 and 9-10 of the drawings. The supporting frame 60 includes a supporting frame panel 62 on which the printed board 42 is superimposed and connected, as by fasteners 64 as shown in FIGS. 2 and 4 of the drawings. The supporting frame 16 is also preferably formed from a plastic material and includes integral risers 66 to which the fasteners 64 threadably mount the printed circuit board 42 in spaced relationship to the supporting frame panel 62 as best seen in FIG. 5 of the drawings. On the opposite side of the supporting frame panel 62, there is provided compartments 68 receiving batteries and a speaker [not shown]. Extending from the top end of the supporting frame panel 62, there is also preferably provided a transversely extending panel 70 which holds and positions the supporting frame 60 in the desired position, as will be described.

In order to position the supporting frame 60 and electronic radio component 12 mounted thereon within the hollow body 16 of the baseball 10, a through recess 72 is provided in the upper thin-walled plastic half section 20 as best seen in FIG. 4 of drawings. Surrounding the recess and extending inwardly therefrom is a shoulder 74 which is designed to engage the lower end of an endless collar 76, the other end of the endless collar 76 being positioned adjacent to and circumferentially extending around the transverse panel 70 as to underlie an outer circumferential lip 78. For purposes to be later described, the baseball cover 18 is also shown in FIG. 2 as having a portion thereof extending between endless collar 76 and an inner wall 80 which extends above the inwardly directed shoulder 74 a distance approximately that of the height of the endless collar 76. Thus, as the supporting frame 60 with the transversally extending panel 70 is lowered through the through recess 72 in the upper thin wall half section 20, the endless collar 76 which underlies and engages the outer circumferential lip 78 will have its lower end brought into abutting engagement with the inwardly directed shoulder 74 to locate the supporting frame 60 including the transversely extending panel 70 relative to the hollow body 16 in the position shown in FIG. 2 of the drawings.

In order to assemble the aforementioned parts together, preferably the upper and lower thin-walled plastic half sections 20, 22, together with the thin-walled plastic disc-shaped element 34, have already been preassembled to one another. This enables the supporting frame 60, electronic component radio 12 fixedly mounted thereon, together with the integral transversely extending panel 70 and circumferentially disposed endless collar 76, to be lowered through the through recess 72 in the upper thin-walled plastic half section 20 until the lower end of the endless collar 76 abuts the inwardly extending shoulder 72. A completed assembly is shown in FIG. 2 of the drawings. The radio 12 mounted on the supporting frame 60 is positioned totally within the confines of the hollow body 16, with only the exposed controls 14a, 14b, 14c extending upwardly therefrom for exposure and operation by a user.

Another important feature of the present invention facilitates assembly and positioning of the supporting frame 60 in a position spacing the supporting frame 60 and electronic component 12 mounted thereto from the thin-walled plastic half sections 20, 22 of the hollow body 16. The disc-shaped element 34 includes a through opening 90 for receiving the supporting frame 60 there through. Adjacent the through opening 90 of the disc-shaped element 34, there is provided alignment means in the form of upstanding and opposed U-shaped sections 92, 94 which extend upwardly from the disc-shaped element 34 as best seen in FIGS. 4 and 11 of the drawings. U-shaped extensions 92, 94 receive the outside edges of the supporting frame panel 62 to facilitate assembly of the supporting frame within the hollow body 16, while affording spaced positioning of the supporting frame 60 and the radio component 12 mounted thereto from the thin-walled plastic half sections 20, 22. On the lower end surface of the supporting frame 60, a projecting male member 96 complementarily engages a female member 98 provided on a inner wall surface of the lower thin-walled plastic half section 20, to also provide alignment, positioning and spacing of the supporting frame 12 with radio component 12 mounted thereon as shown in FIG. 2 of the drawings. The U-shaped extensions 92, 94 and the cooperating male, female elements 96, 98 are thus designed to provide a spaced three-point engagement and positioning of the supporting frame 60 with the radio component 12 mounted thereon spaced from the side walls of the thin-wall plastic half sections 20, 22 throughout the entire circumferential inner extent of the hollow body 16, to prevent damage to the electronic component parts 40 of the radio component 12. In addition, it will be seen that the supporting frame 60 is quickly and easily positioned and aligned in a stable and fixed position within the hollow body 16.

To further assist in the fixed and stable mounting of the supporting frame and radio component 12 within the hollow body 16, the disc-shaped element 34 is further provided with fastening extensions 100, 102 which extend upwardly therefrom and include horizontally extending shoulder projections 104, 106 respectively which underlie the inwardly directed shoulder 74 extending about the through recess 72 in the upper thin wall plastic half section 20. Integral posts 108, 110 extend upwardly beyond the shoulder projections 104, 106 on each of the fastener extensions 100, 102 respectively for aligned mating with holes 112, 114 in the transverse panel 70, as seen in FIGS. 2, 9 and 11, in order to permit threaded fasteners to be inserted in the holes 112, 114 of the transversely extending panel 70 for threaded engagement with the hollow post 108, 110 to tightly secure the supporting panel 16, including the transversally extending panel 70 thereof, to the fastening extensions 100, 102 of the disc-shaped element 34. Thus, as the horizontally extending shoulder projections 104, 106 of the fastening extensions 100, 102 respectively directly underlie and engage the inwardly directed shoulder 74 of the upper thin-walled plastic half section 20, the threaded fasteners [not shown] threadably engage the hollow posts 108, 110 of the fastening extension 100, 102 respectively, causing the outer circumferential lip 78 of the transverse panel to engage the upper surface of the endless collar 76, with the lower end surface of the endless collar 76 overlying the inwardly directed shoulder 74. A tight and secure assembly is thereby provided.

In FIG. 9 of the drawings, the transversely extending panel 70 includes openings 14*aa*, 14*bb* and 14*cc* to correspondingly receive the electronic controls 14*a*, 14*b* and 14*c* there through. In addition, the transverselv extending panel 70 includes openings 68X and 68Y for receiving batteries [not shown] in the smaller battery compartments 68 shown in FIG. 10, and a larger opening 68Z for receiving the speaker in the larger compartment shown in FIG. 10 of the drawings. Electronic component cover 120, as best seen in FIG. 1 and 6-8 of the drawings, includes releasable fastening means which cooperate with releasable fastening means associated with the outer circumferential lip 78 of the transversely extending panel 70. Specifically, the electronic component cover 120 has a circumferentially extending band section 122 having spaced lugs 124 integrally formed thereon. The lugs 124 are positioned adjacent the free end of the circumferential band section 122, while at the opposite end thereof, the top or cover 126 is provided and has an overhanging shoulder 128 at the juncture of band section 122 and cover 126. In assembling electronic component cover 120 relative to the transversely extending panel 70, the lugs 124 are aligned relative to the openings 130 of transversely extending panel 70. It will be noted that the openings 130 have a larger opening at one end to freely accommodate the lugs 124 therein, and then the openings 130 shrink in size as they extend towards and intersect adjacent the outer circumferential lip 78. This enables the lugs 124, upon rotating the electronic component cover 120, to position themselves into underlying releasable locking engagement with the outer circumferential lip 78 of the transversely extending panel 70.

The assembled position of the electronic component cover 120 is shown in FIG. 1 of the drawings. The open area of the electronic component cover 120 receives the electronic controls 14 there through while the cover or top 126 overlies and covers the opening 68X, 68Y, and 68Z containing the batteries [not shown] and the radio speaker [not shown]. The underside of the top or cover 26, includes interconnected battery terminal plates 132, 134 which are provided for engagement with the terminals of batteries [not shown] positioned in the battery compartment 68. The top or cover 126 also is provided with a plurality of closely spaced holes formed therein to permit sound emanating from the speaker [not shown] of the radio component 12 to pass there through. It will also be noted that the upper surface of the cover or top 26 has a curvilinear configuration which corresponds to and merges with the outer curved surfaces of the thin-walled plastic half section 20 surrounding the through recess 72 to provide a pleasing and aesthetic appearance.

As another important feature of the present invention, the flexible seamed baseball covering 18 is brought into close fitting and conforming relationship to the outer wall of the hollow body 18. It is, of course, well known to have a seamed baseball covering around a baseball core; however, where an electronic component 12 is mounted in the simulated baseball 10, different structural configurations and procedural steps must be employed. As specifically shown in FIG. 12 of the drawings, the flexible baseball cover 18 includes a plurality of circumferentially extending and closely spaced flexible fingers 140 which are designed to be received in the recess of the upper thin-walled plastic half section 20. Prior to the mounting and positioning of the supporting frame 60 and electronic component 12 within the hollow body 16, seamed baseball covering 18 is positioned over the hollowed body 16. The seams of the baseball covering will not have been completely sown to allow the hollow body 16 to be positioned therein, or may be simply seamed after the baseball covering 18 is positioned around the hollow body 16. Following this assembly, the circumferentially extending and closely spaced flexible fingers 140 of the baseball covering 18 will be positioned to extend within the through recess 72 of the upper thin-walled plastic half section 20. Thus, as the supporting frame 60 with radio component 12 is positioned in the hollow body 18 and passes beyond the through recess 72, the endless collar 76 will engage and trap the circumferentially extending and closely spaced flexible fingers 140 against the upper inner wall 80 of the upper thin-walled plastic half section 20. The configuration and dimensioning of the endless collar 76 relative to the flexible fingers 140 is such that the endless collar 76 will both trap the flexible fingers 140 against the upper inner wall 80, and at the same time, will draw material portions of the baseball covering 18 which extend outside of and surround flexible fingers 140 into tight-fitting conforming relationship to the hollow body 16. In this way also, the baseball covering 18 is drawn tight and secured around the hollow body 16.

Referring now to the embodiment of the invention shown in FIGS. 13–18 of drawings, it will be seen that the simulated ball used in sports is also shown to be a baseball 210 having an electronic component 212 in the form of an electronic digital clock incorporated therein. The electronic digital clock 212 includes controls 214 exposed therefrom for operation by a user. Baseball 210 includes a hollow body 216, also shown to be in generally spherically-shaped configuration, including complementary upper and lower thin-walled plastic sections 220, 222 with an interfitting end portions 224.

In this embodiment, the interfitting end portions 224, as best seen in FIG. 15, include directly engage outer shoulder portions 226, 228 and circumferentially spaced inner shoulder portions 230, 232 which receive portions of a disc-shaped element 234 there between. As in the previous embodiment the inner and outer shoulder portions are both laterally and circumferentially offset from one another with one of the outer shoulder portions 226 overlapping one of the inner shoulder portions 232 for lateral support increasing hoop strength when the half sections 220, 222 are assembled together. In this embodiment, the disc-shaped element 234 includes a vertically extending wall section 236 and a radially outwardly extending flange 238 which is interposed between and is engaged by the inner shoulder portions 230, 232 of the half sections. Outer flange 238 of the disc-shaped element 234 is sized and positioned to be received both in lateral and circumferential engagement with the lower half sections 220, 222. Specifically, it will be seen that an outer end surface of the flange 238 engages the tapered inner wall surface 240 adjacent the inner shoulder 230 of the upper half section 220, while opposite sides of the flange 238 are directly engaged by the inner shoulders 230, 232 of the upper and lower sections 220, 222 respectively. The vertically extending nose or walled section 236 of the disc-shaped element 234 also provides lateral support and engagement against the inner wall 242 of the lower half section 222. Structural inter-engagement and cooperation of the aforementioned parts contributes to much greater hoop strength in the flexible free ends of the semi-spherically shaped half sections 220, 222, as well as greater circumferential support and strength for the half sections 220, 222.

Since the digital electronic clock 212 is a self contained and much smaller unit than the radio component 12 in the FIGS. 1–12 embodiment, a more simplified construction and assembly is possible. In the FIGS. 13–18 embodiment, the upper half section 220 is formed with a recess 250 having an inner circumferential wall 252 and a bottom wall 254 which is connected to the lower end of the circumferential wall 252 and seals off the recess 250. Integrally formed in the bottom wall 250 is a thickened circumferentially extending section 256 which is designed to be threadably connected to the threaded fasteners 250 which extend through openings in the electronic digital clock 212 as best seen in FIG. 18.

In order to mount the electronic clock 212 to the hollow body 216 while also providing a tight fitting and close conforming relationship of the baseball covering 218 around the hollow body 216, an endless collar 260, having a lower inner shoulder 262 upon which the electronic digital clock 220 rests, is provided. As in the previous embodiment, the endless collar 260 is configured and arranged to engage a plurality of circumferentially extending and closely shape flexible fingers 270 in the baseball cover 218, as seen in FIGS. 16–18, in order to form and trap the flexible fingers 270 against the inner wall 252. As in the previous embodiment, the circumferentially extending and closely spaced flexible fingers 270 are configured and dimensioned relative to the endless collar 260 and the circumferentially extending wall 252 surrounding the recess 250 to enable the endless collar to draw material portions of the ball cover surrounding the flexible fingers 270 into generally tight fitting and close conforming relationship to the generally spherically shaped hollow body 216 of the baseball 210.

Figure 14:
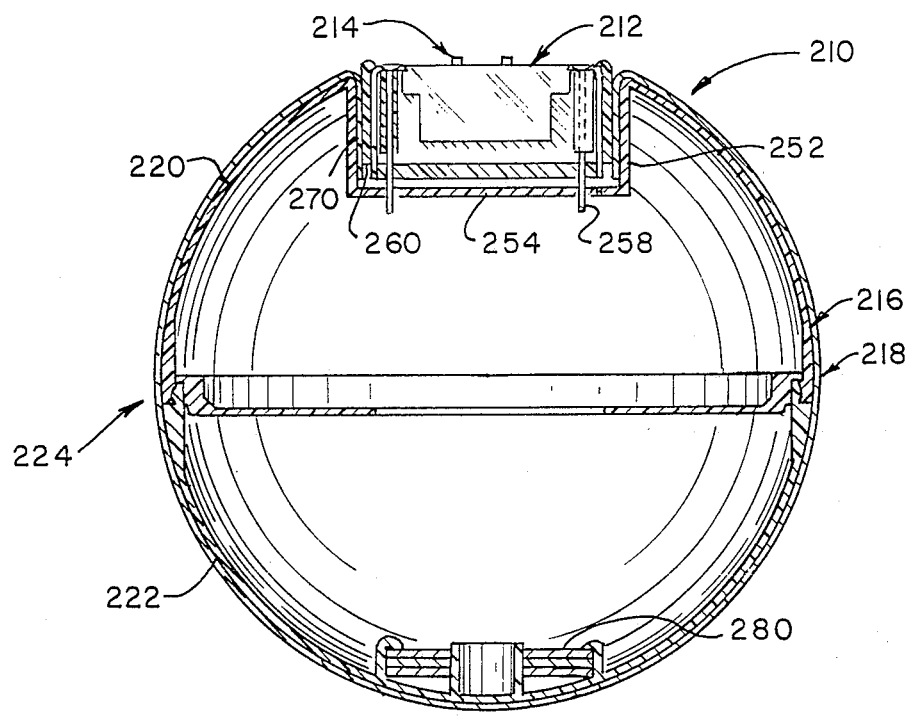
FIG. 14 is a sectional view taken along lines 13—13 of FIG. 14.

With the electronic digital clock 212 mounted to the hollow body 216 as shown in FIG. 14 of the drawings, the smaller shape, size and weight of the electronical digital clock 212 does not provide sufficient stability to prevent the baseball 210 from rolling from side to side when placed on a table. Accordingly, weighted elements 280 may be provided in the lower half section 222 in order to provide balance and stability to the baseball 210. Additionally, if desired, a pedestal base on which the baseball is positioned and held in non-rocking relationship may be provided.

In view of the above it will be seen that the above set forth and other objects of this invention are achieved, as well as other advantageous results being obtained.

As various changes could be made in the above constructions without departing from the scope of the invention, it is intended that all matter contained in the above description are shown in the accompanied drawings shall be interpreted as illustrative and not in a limiting sense.

What is claimed:

1. A simulated ball used in sports having an electronic component mounted therein with exposed controls for operation by a user, said ball including a hollow body over which a complementary shaped flexible ball cover is mounted, said body receiving said electronic component in a recess provided in an outer wall of said hollow body, said body including means associated therewith to position and hold said electronic component within said hollow body, said complementary shaped flexible ball cover having a corresponding opening there through to allow exposure of the controls of the electronic component, said ball cover being drawn in generally close-fitting and conforming relationship to the outer wall of said hollow body including at least partially within the recess thereof; and said body being formed from two generally curvilinearly shaped thin-walled plastic half sections which terminate in complementary interfitting free end portions, a thin-walled plastic disc-shaped element extending substantially across the hollow body and structurally inter-engaging the complementary interfitting free end portions to provide laterally outwardly directed and circumferentially extending support therefor.

2. The simulated ball as defined in claim 1 wherein said electronic component is fixedly mounted to a supporting frame positioned within the confines of said hollow body, and said body having alignment means associated therewith to facilitate assembly and positioning of the supporting frame in position spacing the supporting frame and the electronic component mounted thereto from the hollow body.

3. The simulated ball as defined in claim 1 and further including an electronic component cover which is mounted to the recess of said hollow body to cover the electronic component while allowing the controls thereof to be exposed, said electronic component cover having an outer curvilinear surface corresponding to the curved outer wall of the hollow body surrounding the recess thereof.

4. A generally curvilinearly-shaped hollow body having an electronic component mounted therein with the controls for the electronic component being exposed for operation by a user, said body being formed from two generally curvilinearly shaped thin-walled plastic half sections which terminate in complementary interfitting free end portions, a thin-walled plastic disc element extending substantially across the hollow body and structurally inter-engaging the complementary interfitting free end portions of the thin-walled plastic half sections in planes aligned with and transverse to the disc-shaped element to provide outwardly directed and circumferentially extending support for the thin-walled half sections in the complementary interfitting free end thereof, said electronic component being fixedly mounted to a supporting frame positioned wholly within the confines of and spaced from said body, said body having alignment means associated therewith to facilitate assembly and positioning of the supporting frame in a position spacing the supporting frame and the electronic component mounted thereto from the thin-walled plastic half sections within said body, means for mounting the supporting frame to the body in its predetermined aligned position within the assembled thin-walled plastic half sections forming said body; a through opening in said disc-shaped element for receiving said supporting frame therethrough, and said alignment means for said supporting frame being provided on said disc-shaped element adjacent the through opening thereof.

5. The body as defined in claim 4 wherein said alignment means further includes cooperating male and female members provided on a lower end surface of the supporting frame and an inner wall surface of the other of said thin-walled plastic half sections opposite the through recess formed in said one thin-walled plastic half section.

6. The body as defined in claim 4 wherein said alignment means provided on said disc-element includes U-shaped extensions provided adjacent the through opening for receiving outer side edges of the supporting frame there between.

7. The body as defined in claim 6 wherein said disc-shaped element further includes fastening extensions provided thereon having shoulder projections which underlie the inwardly directed shoulder means extending about the through recess, and fasteners associated with the transversely extending panel means for cooperation with said fastening extensions provided on said disc-shaped element.

8. The body as defined in claim 7 and including an endless collar which underlies the outer circumferential extent of said transversely extending panel means and overlies the inwardly directed shoulder means extending about the through recess.

9. The body as defined in claim 8 and including a flexible covering surrounding the body and including flexible fingers which are trapped by said endless collar to draw the flexible covering in close fitting relationship to said body.

10. The body as defined in claim 4 wherein said supporting frame is received within a through recess formed in one of said thin walled plastic half sections, inwardly directed shoulder means extending about the through recess in said one thin-walled plastic half section, and said supporting frame having transversely extending panel means at one end thereof for overlying said inwardly directed shoulder means to hold and position said transversely extending panel means within said through recess.

11. The body as defined in claim 10 wherein the transversely extending panel means includes an outer circumferential lip which is positioned in general alignment with outermost areas of the thin-walled plastic half section surrounding said through recess.

12. The body as defined in claim 11 wherein said transversely extending panel means includes openings for receiving batteries within battery compartments mounted on said supporting frame.

13. The body as defined in claim 12 and including an electronic component cover having releasable fastening means cooperating with releasable fastening means provided on the outer circumferential lip of said transversely extending panel means.

14. The body as defined in claim 13 wherein said electronic component cover includes an open area and a covered area, said open area receiving the controls from the electronic component, and said covered area having battery terminal plates mounted on the underside thereof for cooperation with the terminals of batteries positioned in said battery compartments.

15. The body as defined in claim 14 wherein the covered area of said electronic component cover further includes a plurality of closely spaced holes formed therein to permit sound emanating from the electronic component to pass there through.

16. The body as defined in claim 15 wherein the upper surface of the covered area of the cover has a curvilinear configuration which corresponds to and merges with the outer curved surfaces of the thin-walled plastic half section surrounding the through recess.

17. A generally curvilinearly-shaped hollow body formed from two generally curvilinearly-shaped and complementary thin-walled plastic half sections which terminate in complementary interfitting free end portions, a thin-walled plastic disc-shaped element extending substantially across the hollow body and structurally inter-engaging the complementary interfitting free end portions of the thin-walled plastic half sections in planes generally aligned with and transverse to the disc-shaped element to provide laterally outwardly directed and circumferentially extending support for the thin-walled plastic half sections in the complementary interfitting free end portions thereof, and means in the vicinity of said complementary interfitting free end portions for holding the thin-walled plastic half sections together to form the generally spherically-shaped hollow body.

18. The body as defined in claim 17 wherein said complementary interfitting end portions include laterally and circumferentially offset inner and outer shoulder portions on each of said thin-walled plastic half sections which have a complementary interfitting relationship with one another.

19. The body as defined in claim 18 wherein at least the outer laterally and circumferentially offset shoulder portions on one of said thin-walled plastic half sections directly engages the corresponding outer laterally and circumferentially offset shoulder portion of the other thin-walled plastic half section.

20. The body as defined in claim 19 wherein the inner laterally and circumferentially offset shoulder on one of said thin-walled plastic half sections is circumferentially spaced from the corresponding inner laterally and circumferentially offset shoulder of the other of said thin-walled plastic half sections, and said thin-walled plastic disc-shaped element is received there between.

21. The body as defined in claim 20 wherein the thin-walled plastic disc-shaped element is sized and positioned to be received in both lateral and circumferential engagement with the complementary interfitting free end portions of the thin-walled plastic half sections.

22. The body as defined in claim 21 wherein the disc-shaped element includes a circumferential end surface which engages at least one of said thin-walled plastic half sections along an inner surface wall thereof.

23. The body as defined in claim 22 wherein the circumferential end surface of said thin-walled disc-shaped element engages both of said thin-walled plastic half sections along circumferentially spaced inner walls thereof.

24. The body as defined in claim 23 wherein said means for holding the thin-walled plastic half sections together includes releasable fastening means.

25. The body as defined in claim 24 wherein said releasable fastening means includes releasable interlocking means integrally associated with said complementary interfitting free end portions.

26. The body as defined in claim 25 wherein said thin-walled plastic disc-shaped element includes means for mounting an electronic component spaced from the complementary-shaped thin-walled plastic half sections of said body.

27. A simulated ball used in sports having an electronic component mounted therein, comprising a generally curvilinearly shaped hollow body over which a complementary-shaped flexible ball cover is mounted, said body receiving said electronic component in a complementary-shaped recess formed in said body, said ball cover having a plurality of circumferentially extending and closely spaced flexible fingers which are received within the recess of said body, an endless collar which engages and traps the flexible fingers of the ball cover against an inner wall of the body recess, said electronic component being received in said body recess within said endless collar, and means for releasably mounting the electronic component to said body.

28. The simulated ball as defined in claim 27 wherein said flexible fingers are provided in a limited surface area of a ball cover having seams therein, said limited surface area containing said flexible fingers being smaller than a circumscribed area within the inner wall of the body recess.

29. The simulated ball as defined in claim 28 wherein the circumferentially extending and closely spaced flexible fingers are configured and dimensioned relative to said endless collar and body recess to enable said endless collar to draw material portions of the ball cover surrounding said flexible fingers in generally tight-fitting and conforming relationship to the generally curvilinearly shaped body over which the ball cover is mounted.

30. The simulated ball as defined in claim 29 wherein the body recess includes a inwardly directed shoulder for receiving a lower end surface of said endless collar.

31. The simulated ball as defined in claim 30 wherein the body recess has a through opening extending into the body for receiving at least part of the electronic component therein, said through opening extending within the confines of the inwardly directed shoulder.

32. The simulated ball as defined in claim 31 wherein the endless collar has at least a circumferential portion thereof which underlies and supports the electronic component.

33. The simulated ball as defined in claim 32 including means for threadably connecting the electronic component to said body.

34. The method of mounting an electronic component in a simulated ball with a tight fitting seamed flexible ball cover positioned in a complementary conformed relationship about a generally curvilinearly-shaped body, said body having a recess formed therein for receiving said electronic component, wherein the steps include:

forming a plurality of circumferentially extending and closely spaced flexible fingers from a limited surface area of the baseball cover within the seams thereof, positioning said flexible fingers in said body recess, trapping said flexible fingers in said body recess, drawing material portions of said ball cover surrounding said flexible fingers in generally tight-fitting and conforming relationship to the generally curvilinearly-shaped body, and thereafter positioning and mounting said electronic component within the body recess over the flexible fingers of said ball cover.

35. The method as defined in claim 34 including the step of simultaneously trapping the flexible fingers in said body recess and drawing the surrounding material portions in tight-fitting and conforming relationship to said body.

36. The method as defined in claim 34 including the step of releasable locking of said flexible fingers to said body within the recess thereof.

* * * * *